Patented Dec. 28, 1943

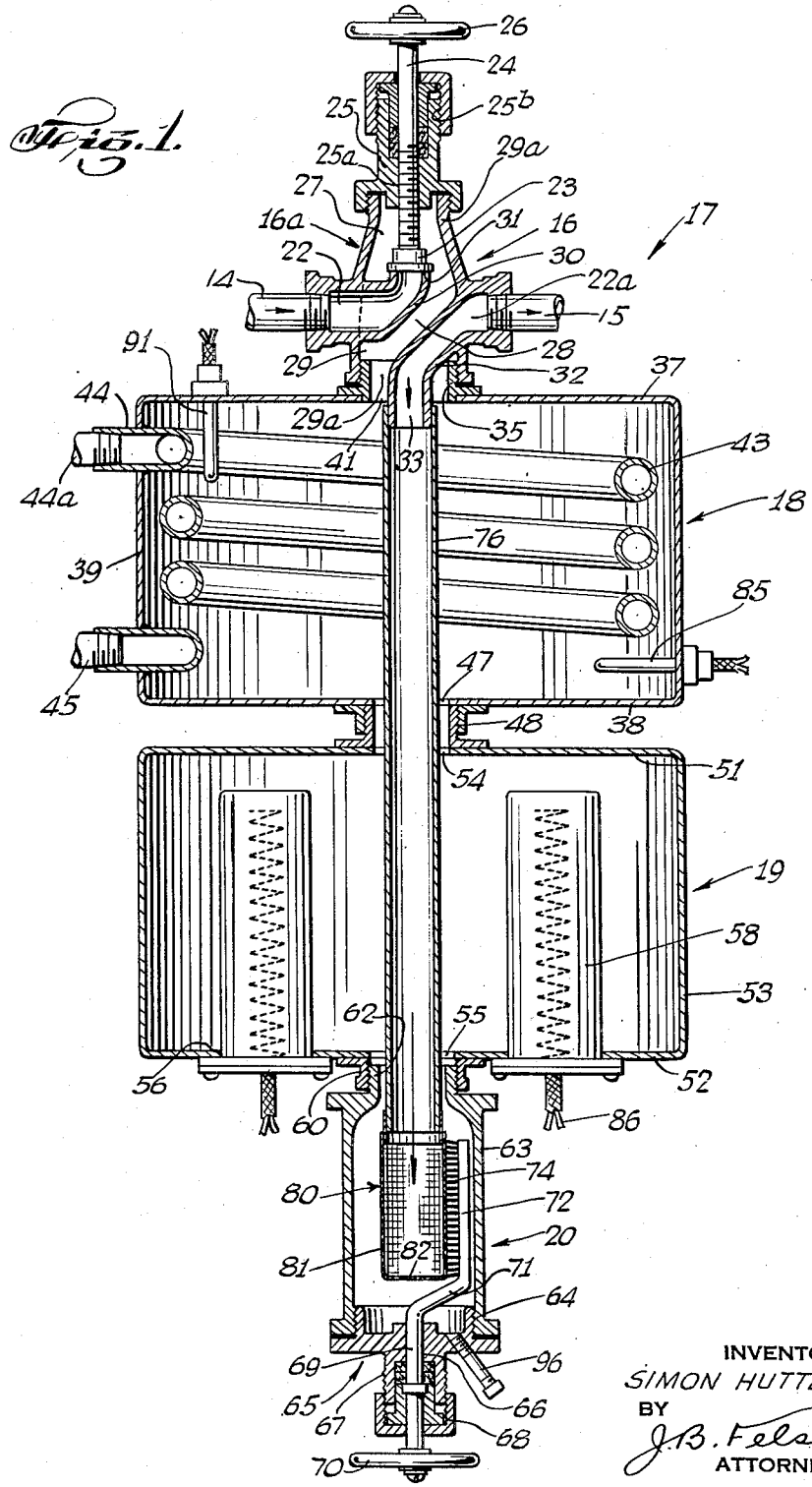

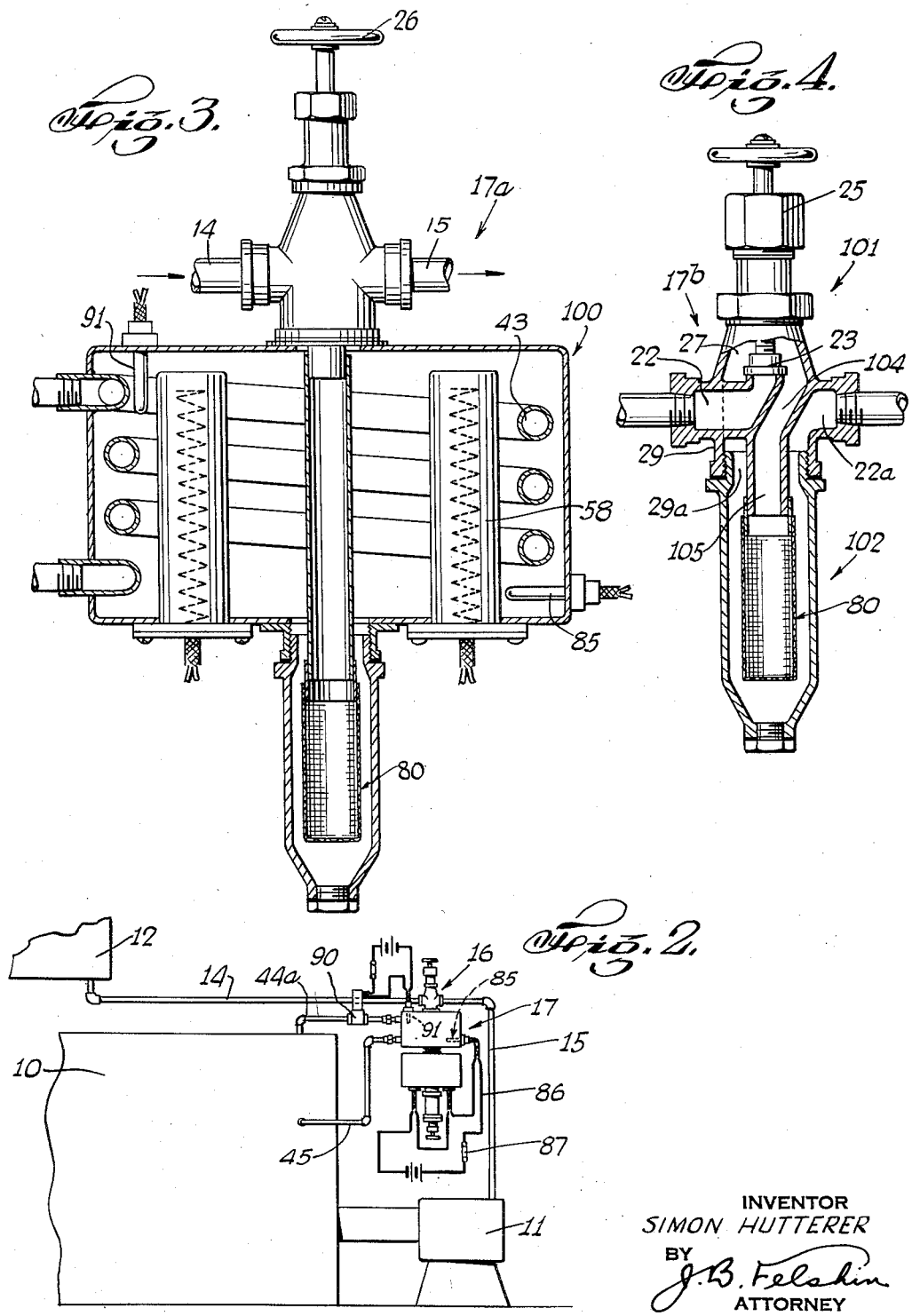

2,337,893

UNITED STATES PATENT OFFICE 2,337,893

COMBINATION VALVE, STRAINER, AND PREHEATER

Simon Hutterer, New York, N. Y.

Application February 17, 1940, Serial No. 319,391

7 Claims. (Cl. 210—150.5)

This invention relates to a combination valve, strainer and preheater for fuel oil, used particularly in connection with oil burners for boilers, and the like devices.

An object of this invention is to provide in a device of the character described, a valve so constructed that the packing gland is not under pressure of the oil when the valve is closed, the exterior of the valve, nevertheless, being standard in design.

A further object of this invention is to provide in a device of the character described, highly improved mechanism, operable from the outside of said device, for cleaning the strainer.

Yet a further object of this invention is to provide in a device of the character described, electric heating elements which may simply be screwed into the device and readily removed therefrom, the construction being such that the number of heating elements may be varied and said units may be connected in series circuit.

A still further object of this invention is to provide in a device of the character described, a highly improved heating chamber through which the oil circulates, and which is heated both by steam from the boiler fired by the oil burner, and also by electric heating elements.

Still another object of this invention is to provide a device of the character described, in which a heating chamber or heating chambers may be interposed between the strainer chamber and the valve, the strainer being connected to the valve by a tube, the length of which may be varied to accommodate the length of the heating chambers, the arrangement being such furthermore that the oil must circulate twice through the heating chambers, once going in one direction from the valve to the strainer chamber, and secondly from the strainer chamber back to the valve, thus insuring a thorough preheating of the oil.

Yet a further object of this invention is to provide in a device of the character described, a valve controlling circulation of oil through a strainer and so arranged that the oil passes from the outside of the strainer to the inside thereof, so that sediment is collected on the outside of the strainer where it may be more readily cleaned.

A yet further object of this invention is to provide an oil preheater for an oil burner adapted to fire a boiler in which the oil is preheated both by an electric unit and by steam from the boiler, the steam preheater being provided with a thermostatic switch to control the electric heating units of the electric preheater so that the oil may be initially preheated by the electric preheater, and when sufficient steam is generated in the boiler by the oil burner to raise the temperature in the steam preheater above a predetermined temperature, the electric heating units in the electric preheater will be automatically shut off, while the oil continues to be preheated by the steam preheater alone; means being also provided to cut off circulation of steam to the steam preheater when the temperature therein exceeds another higher predetermined temperature.

Still another object of this invention is to provide a device of the character described which may be interposed as a unit in the fuel supply line leading to the oil burner, and in which the electric and steam heating units may be in separate chambers, or combined in a single chamber, or entirely omitted, in which event the strainer chamber is connected directly to the valve.

Yet another object of this invention is to provide a strong, rugged and durable device of the character described which shall be relatively inexpensive to manufacture, easy to assemble and install, easy to clean, smooth and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown various possible illustrative embodiments of this invention, Fig. 1 is an elevational, cross-sectional view through a combination valve, preheater and strainer embodying the invention.

Fig. 2 is a side elevational view of a boiler system embodying the invention provided with an improved oil preheater, valve and strainer.

Fig. 3 is a view similar to Fig. 1 but illustrating a modifying form of the invention in which the oil is preheated both by steam and electric heating units in a single chamber; and Fig. 4 is a view similar to Fig. 1, and illustrates a still further modifying form of the invention, and in which the preheated unit is omitted.

Referring now in detail to the drawings, 10 designates a boiler fired by an oil burner 11 of usual construction. In said figure 12 designates a usual oil tank connected by supply pipes 14, 15 to fuel inlet of the oil burner; and interposed between said pipes is a valve 16 forming part of a combination valve, preheater and strainer device 17 embodying the invention.

Referring now to Fig. 1 of the drawings, the device 17 comprises generally the valve 16, a steam preheating chamber 18, an electric preheating chamber 19, and a strainer casing or chamber 20.

The valve 16 comprises a body 16a formed with an inlet passage 22 and an outlet passage 22a, aligned therewith. At the lower end of the body 16a is a neck portion 29, and at the upper end of the body, is an annular portion 29a.

Screwed to the annular portion 29a is a closure member 25 formed with an internal screw threaded portion 25a. Screwed within the screw threaded portion 25a, is a valve stem 24, to the upper end of which is fixed a handle 26. At the lower end of the stem 24, is a valve head 23. Screwed to the closure member 25, is a packing gland 25b through which the stem 24 passes.

Extending from the inlet end 22 of the valve 16, is an upwardly inclined tubular portion 30, formed with a valve seat 31 at its upper end, disposed below and adapted to be closed by the valve head 23. Extending from the outlet end 22a of the valve, is a downwardly inclined tubular portion 32 terminating in a vertical tubular extension 33 concentric with the neck 29. The annular chamber 29a within the neck 29 and surrounding the tubular extension 33, communicates through an upwardly inclined passage 28 with the chamber 27 which surrounds the lower end of the stem 24.

Thus, when the valve is closed, the oil under tank pressure is stopped by the valve head 23, and hence does not press against the packing gland, thus eliminating the danger of leakage.

Screwed to the neck 29 is a sleeve 35, to which the upper end of the heating chamber 18 is fixed. Said chamber 18 has a top wall 37, a bottom wall 38, and a cylindrical wall 39 interconnecting said top and bottom walls. The top wall 37 is formed with an opening 41 communicating with the annular chamber 29a.

Within the chamber 18 is an annular coil 43 having an inlet end 44 and an outlet end 45, both passing through the annular wall 39 of said chamber. Connected to the inlet and outlet ends 44 and 45, are pipes 44a and 45a communicating with the steam chamber of the boiler whereby to permit steam from the steam chamber to circulate in said coil.

The bottom wall 38 of chamber 18 is formed with an opening 47, and fixed to said bottom wall, is a sleeve 48 communicating with said opening. Attached to the lower end of sleeve 48, is the electric heating chamber 19. Said heating chamber comprises a top wall 51, a bottom wall 52, and a cylindrical wall 53 interconnecting said top and bottom walls. The top wall 51 is formed with a central opening 54 communicating through the sleeve 48 with the chamber 18.

The bottom wall 52 is formed with a central opening 55, and with a plurality of equiangularly spaced, circular openings 56. Inserted through each opening 56 is an electric heating unit 58 which may be screwed into said opening in any suitable manner, to close the same. Fixed to the bottom wall 52 is an internally screw threaded sleeve 60 concentric with the central opening 55.

The strainer chamber 20 has an externally screw threaded neck 62 at its upper end screwed to said sleeve 60. Said chamber has a cylindrical wall 63 having internal screw threads 64 at its lower end. Screwed to the internal screw threaded portion 64 of wall 63, is a bottom cover 65 formed with a central opening 66 and with an externally screw threaded neck 67. Screwed to said neck 67 is a packing gland 68.

Rotatably mounted in said opening 66 and passing through the packing gland 68 is a stem 69, to the lower end of which is fixed a handle 70. Extending from the stem 69 is an offset arm 71, from which there extends upwardly, a vertical brush 72 having radial, inwardly extending brush elements 74, for the purpose hereinafter appearing.

Attached to the lower end of the tubular portion 33 of the valve 16, is an elongated, vertical, axial tube 76 passing through the chambers 18 and 19, openings 47, 54 and 55, and projecting down into the chamber 20. The outer diameter of tube 76 is less than the diameter of opening 44, 54 and 55. Attached to the lower end of the pipe 76 is the upper, open end of a cylindrical strainer 80. The latter has a cylindrical wall 81 and a circular bottom wall 82. Strainer 80 is disposed wholly within the strainer chamber 20. The bristles 74 of the brush contact the outside of the cylindrical wall 81 of the strainer.

Attached to a wall of the chamber 18 and projecting thereinto, is a thermostatic switch 85, connected in series circuit, by wiring 86, to the electric heating units 58. A hand switch 87 may be interposed in said wiring 86.

The pipe 44a may be provided with any suitable electromagnetic valve 90 controlled by a thermostatic switch 91 projecting into the chamber 18 through a wall thereof. The thermostat 85 may be set at one temperature and the thermostat 90 at a higher temperature.

The operation of the device will now be described:

When the valve handle 26 is turned to open the valve 16, oil will pass from the tank 12, through pipe 14 into chamber 27, through passage 28, through passage 29a, through the heating chamber 18, through opening 47, sleeve 48, opening 54 into the chamber 19. The oil will then pass through the opening 55 into the strainer chamber 20, and then into the strainer 80 and into pipe 76, then through tubes 33 and 32, through outlet 22a to pipe 15, and hence to the oil burner.

When it is desired to fire the boiler 10, the valve 16 is opened and the switch 87 is closed to energize the electric heating units 58. Oil will then be preheated in the chamber 19. The oil is thus preheated as it passes through the oil burner. As steam is generated in the boiler, steam will pass through the steam coil 43, thus heating up the oil in chamber 18. When the temperature in the chamber 18 reaches the point at which the thermostat 85 is set, the circuit for the heating units 58 will be opened, so that the oil will be heated only by the steam passing through the coil 43. When the temperature of the oil in chamber 18 exceeds the point at which the thermostat 91 is set, said thermostat will automatically shut the valve 90 to shut off the supply of steam to the coil 43 and thus prevent heating the oil to too great a temperature. When temperature in the chamber 18 falls below the point at which the thermostat 91 is set, the circuit for said thermostat will again close to open valve 90.

It will be noted that the oil is heated on its way down through the chambers 18 and 19, and is again heated on its way up through the pipe 76, thus ensuring thorough preheating of the oil.

It will be noted furthermore that the oil passes from the outside of the strainer 80 to the inside thereof. Sediment will thus accumulate on the outside of said strainer where it can be cleaned by rotating brush handle 76. The cover 65 may be provided with a drainer plug 96 which may be opened to clean out sediment form the strainer chamber.

It will be noted that any suitable number of electric heating units 58 may be employed, and when one or more of the units are removed, the openings 56 may be closed and sealed by plugs, or in any other suitable manner.

In Fig. 3 there is shown a device 17a, embodying the invention, similar to the device 17, with the exception that a single heating chamber 100 is employed, and heated both by steam coil 43 and by electric heating units 58.

The chamber 100 may be provided with thermostats 85 and 91 to control the circuit for the heating units 58 and for the valve 90 in the steam pipe 44a. If desired, the cleaning brush may be omitted.

In Fig. 4 there is shown a device 17b, embodying the invention, and illustrating a further modified form thereof. In the device 17b, the preheating system is entirely omitted, said device comprising a valve 101, to the lower end of which is connected a strainer chamber 102.

The valve 101 has an inlet 22 adapted to be closed by a valve head 23, similar to the valve 16. In the valve 101, however, the outlet end 22a communicates with the interior 29a of the neck 29. The chamber 27 which surrounds the steam of the valve communicates through a passage 104 with a central pipe 105 concentric with the neck 29 and projecting into the strainer chamber 102. The strainer 80 is attached directly to the lower end of the pipe 105. Thus, when the valve is open, the oil passes through inlet 22, chamber 27, chamber 104 and pipe 105, to the inside of the strainer 80. The oil passing through the strainer may then go up through the strainer chamber 102 and annular passage 29a to the outlet end 22a of the valve.

Thus, when the valve 101 is closed, the packing gland 25b thereof does not have the pressure of the oil from the tank, hence preventing leakage. The oil, however, passes from the interior of the strainer to the exterior thereof, instead of vice versa, as in devices 17 and 17a.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In combination, a valve comprising a body having an inlet and an outlet, an internal chamber communicating with said inlet, and a tube communicating with said outlet, a neck surrounding said tube and communicating with said chamber, a valve stem extending through said body into said chamber and having a head adapted to close said inlet to close communication between the inlet and chamber, a packing gland on said body, said stem passing through said gland, a strainer casing attached to said neck and likewise communicating with said chamber, and a tubular strainer within said strainer casing connected to said tube and communicating with said outlet, whereby when the valve stem is open, fluid may pass through said inlet to said chamber, then from said chamber through said neck to said casing, then from the outside of said strainer in said casing into the inside of said strainer, then from said strainer into said tube and through said outlet.

2. In combination, a valve comprising a body having an inlet and an outlet, an internal chamber communicating with said inlet, and a tube communicating with said outlet, a neck surrounding said tube and communicating with said chamber, a valve stem extending through said body into said chamber and having a head adapted to close said inlet to close communication between said inlet and chamber, a packing gland on said body, said stem passing through said gland, a strainer casing attached to said neck and likewise communicating with said chamber, a tubular strainer within said strainer casing and connected to said tube and communicating with said outlet, whereby when the valve is open, fluid may pass through said inlet to said chamber through said neck, then from said chamber to said casing, then from the outside of said strainer in said casing into the inside of said strainer, then from said strainer into said tube and through said outlet, and a brush within said casing adapted to clean the outer surface of said strainer, and means on the outside of said casing to move said brush.

3. In combination, a valve, a heating chamber attached thereto, a strainer casing attached to said heating chamber, heating means in said chamber, a strainer in said casing, said valve having an inlet and outlet, conduit means in said valve interconnecting said inlet with said chamber, said chamber communicating with said casing, conduit means interconnecting said strainer with said outlet.

4. In combination, a valve, a heating chamber attached thereto, a strainer casing attached to said heating chamber, heating means in said chamber, a strainer in said casing, said valve having an inlet and outlet, conduit means in said valve interconnecting said inlet with said chamber, said chamber communicating with said casing, conduit means interconnecting said strainer with said outlet, said conduit means passing through said chamber.

5. In combination, a valve, a heating chamber attached thereto, a strainer casing attached to said heating chamber, heating means in said chamber, a strainer in said casing, said valve having an inlet and outlet, conduit means in said valve interconnecting said inlet with said chamber, said chamber communicating with said casing, conduit means interconnecting said strainer with said outlet, and means within said casing to clean the outside of said strainer.

6. In combination, a valve, a heating chamber attached thereto, a strainer casing attached to said heating chamber, heating means in said chamber, a strainer in said casing, said valve having an inlet and outlet, conduit means in said valve interconnecting said inlet with said chamber, said chamber communicating with said casing, conduit means interconnecting said strainer with said outlet, and means within said casing to clean the outside of said strainer, said means being operable from the outside of said casing.

7. In combination, a valve comprising a body having an inlet and an outlet, and an internal chamber, a valve stem passing through said body into said chamber and having means thereon to close said inlet to prevent fluid from passing from said inlet to said chamber, a casing attached to said valve body and communicating with said chamber, heating means in said casing, a strainer casing attached to said first casing and communicating therewith, a strainer in said strainer casing, and tubular means connecting said strainer with said outlet and passing through the heating chamber.

SIMON HUTTERER.